United States Patent [19]

Arakawa et al.

[11] Patent Number: 4,939,620
[45] Date of Patent: Jul. 3, 1990

[54] HIGH-VOLTAGE CERAMIC CAPACITOR AND METHOD OF ITS MANUFACTURE

[75] Inventors: Hajime Arakawa; Motoaki Kakio, both of Nagaokakyo, Japan

[73] Assignee: Murata Manufacturing Co., Ltd., Japan

[21] Appl. No.: 357,545

[22] Filed: May 26, 1989

[30] Foreign Application Priority Data

May 30, 1988 [JP] Japan .................. 63-132230

[51] Int. Cl.⁵ .................. H01G 4/10; H01G 7/00
[52] U.S. Cl. .................. 361/321; 29/25.42
[58] Field of Search .................. 361/320, 321, 306; 264/61; 501/136; 252/512; 29/25.42

[56] References Cited

U.S. PATENT DOCUMENTS 3,047,782  7/1962  McCarthy ............ 361/321 X
3,133,338  5/1964  Fabricius et al. .......... 29/25.42
3,426,250  2/1969  Kahn .................... 361/321
3,946,290  3/1976  Yoshioka et al. .......... 361/306

FOREIGN PATENT DOCUMENTS 123619  2/1947  Australia ................ 361/321
89962   8/1978  Japan .................... 361/321

Primary Examiner—Donald A. Griffin
Attorney, Agent, or Firm—Ostrolenk, Faber, Gerb & Soffen

[57] ABSTRACT

A high-voltage ceramic capacitor comprises a dielectric ceramic element. Electrodes using silver material are formed on the opposite surfaces of the dielectric ceramic element. A reduced region is formed in the vicinity of the end-edge part of each of the electrodes on the surface of the dielectric ceramic element. This reduced region is formed by coating a reducing agent the main component of which is a material having a strong oxidizing inclination on the dielectric ceramic element and heating it. Furthermore, an external terminal is soldered to each of the electrodes.

6 Claims, 3 Drawing Sheets

HIGH-VOLTAGE CERAMIC CAPACITOR AND METHOD OF ITS MANUFACTURE

BACKGROUND OF THE INVENTION

1. Field of the Invention

The present invention relates to a high-voltage ceramic capacitor on which a high voltage is applied and a method of manufacturing it.

2. Description of Background Art

Generally, dielectric ceramic such as barium titanate has a high dielectric constant and a small tan δ and, therefore, a capacitor is obtainable that has a comparatively large capacity and high withstand voltage despite a small size. For this reason, capacitors using such a material have been utilized so far also for electric power equipment, for example, for surge-absorbing capacitors for circuit breakers.

FIG. 3 and FIG. 4 are cross-sectional views respectively showing one example of conventional capacitors for electric power equipment.

As shown in FIG. 3, a capacitor 1 comprises a cylindrical dielectric ceramic element 2, and a silver electrode 3 is formed on the top surface thereof and a silver electrode 4 is formed on the bottom surface thereof, respectively. The capacitor 1 is formed so that the diameters of the electrodes 3 and 4 are somewhat smaller than the diameter of the element 2, and thereby the surface distance between the ends of the electrodes 3 and 4 is elongated. This improves the pressure-resisting characteristic of the capacitor 1 against creeping discharge. On the center portion of the electrode 3, an external terminal 5 is bonded through a conductive adhesive 6. Similarly, on the center portion of the electrode 4, an external terminal 7 is bonded through a conductive adhesive 8. Furthermore, the is surrounded by a molding comprising dielectric ceramic element 2 are molded with an insulating resin 9. Female threads are formed in the external terminals 5 and 7 to allow leads to be connected or to allow other capacitors of the same shape to be connected in series.

Also, the capacitor as shown in FIG. 4 has nearly the same structure as that of the capacitor as shown in FIG. 3, but differs in that aluminum is used for the material of the electrodes 10 and 11 and glasses 12 and 13, the main component of which is borosilicate lead glass, are fusion-stuck in an annular shape on the end-edges of the electrodes. Formation of glass portions on the end-edge portion of the electrodes 10 and 11 in such a manner can improve the pressure-resisting characteristic against creeping discharge. Also, the glass portions 12 and 13 have a comparatively higher dielectric constant than that of the insulating resin 9, and therefore electric field concentration at the electrode end is alleviated, resulting in an improvement in the breakdown voltage of the dielectric ceramic element in the vicinity of the electrode end part. However, the above-described conventional high-voltage ceramic capacitor may suffer problems, as noted below.

Where the breakdown voltage of capacitors is measured, two methods are employed: a method wherein high-voltage impulses are applied across the external terminals of a capacitor to be measured and a breakdown test is conducted by gradually raising the voltage thereof; and a method wherein a large number of capacitors to be measured are connected in a series-parallel fashion, high-voltage impulses are applied across two terminals of the capacitor circuit, and a breakdown test is conducted by gradually raising the voltage thereof. However, in some cases, the value of breakdown voltage per one capacitor obtained by the method of connecting a large number of capacitors in a series-parallel fashion was lower than the value of breakdown voltage obtained by the method of measuring a single capacitor. This phenomenon took place where a specific conductive adhesive is used for, bonding between the electrode and the external terminal, and remarkably did not appear where a conductive adhesive was used which was prepared with a special component and a special combining ratio.

A possible cause of a reduction in the value of breakdown voltage per one capacitor where a large number of capacitors are connected in a series-parallel fashion to be measured is that particularly when an impulse voltage having a very short duration of wave front is applied, the resistance value attributed to the resin component in the conductive, adhesive is increased sharply; and a high voltage is thus applied to the conductive adhesive portion between the electrode and the external terminal, and an imbalance of voltage share of each part of the capacitor takes place. In such a case, when a breakdown occurs at the conductive adhesive portion, the voltage share of each part of one capacitor and the voltage share of each of a plurality of capacitors change sharply, and a capacitor to which the highest voltage is applied can conceivably be broken down.

The above-described problem does not take place if the external terminal can be bonded to the electrode by soldering, but in a capacitor having a high breakdown voltage as shown in FIG. 4, a base metal such as aluminum, was used for the electrode, and therefore soldering could not be applied. In addition, it is also considered to apply glass treatment as shown in FIG. 4 to the capacitor of a silver-electrode type as shown in FIG. 3, but this hardly improves the impulse voltage-resisting characteristic in comparison with the case of applying glass treatment to the base metal electrode.

SUMMARY OF THE INVENTION

Objects of the present invention are to provide a highvoltage ceramic capacitor capable of preventing a reduction in the value of breakdown voltage per one capacitor even where a large number of capacitors are connected in a seriesparallel fashion so as to be used as a composite capacitor having a large capacity and a high withstand voltage, and to provide a method of manufacturing such a high-voltage ceramic capacitor.

A high-voltage ceramic, capacitor in accordance with the present invention the feature comprises a ceramic capacitor having two opposite electrodes formed on a dielectric ceramic element, and wherein a reduced region is formed in the vicinity of each of the electrode end-edges of the surface parts of the dielectric ceramic element, each electrode is formed with silver material, and an external terminal is soldered to this electrode.

Also, a method of manufacturing a high-voltage ceramic capacitor in accordance with the present invention comprises the step of; preparing a dielectric ceramic element a step of preparing a conductive material the main component of which is silver powder, a step of preparing a reducing agent the main component of which is a metal having an oxidizing inclination stronger than the dielectric ceramic element, a coating a conductive material on the dielectric ceramic element so that the surfaces of the dielectric ceramic element are exposed at the end-edge parts thereof; a forming electrodes by heating, the conductive material coated on the dielectric ceramic element; coating the reducing agent on the exposed portions of the dielectric ceramic element at the electrode end-edge parts; forming reduced regions on the dielectric ceramic element by heating the dielectric ceramic element coated with the reducing agent, and soldering an external terminal to each of the electrodes.

Also, a method of manufacturing a high-voltage ceramic capacitor in accordance with the present invention comprises the steps of: preparing a dielectric ceramic element; preparing a conductive material, the main component of which is silver power; preparing a reducing agent the main component of which is a metal having an oxidizing inclination stronger than that of the dielectric ceramic element; coating the conductive material on the dielectric ceramic element so that the surface of the dielectric ceramic element is exposed at the end-edge parts thereof; coating the reducing agent on the exposed portions of the dielectric ceramic element at the end-edge parts of the conductive material coated on the dielectric ceramic element; forming the reducing regions simultaneously with forming electrodes by heating the dielectric ceramic element coated with the conductive material and the reducing agent; and soldering an external terminal to each of the electrodes.

In the high-voltage ceramic capacitor of the present invention, the reduced region is formed on the surface portion of the dielectric ceramic element positioned in the vicinity of the electrode end-edge part. Carriers are present in this region where the dielectric ceramic has been reduced, and therefore this region has a low resistivity in comparison with other regions. Since this low-resistivity region is present at the end-edge part of the electrode, electric field concentration at the electrode end-edge is alleviated and the potential gradient is suppressed so as to be low. Accordingly, a high withstand voltage is provided as to the whole capacitor. Also, the external terminal is soldered to the electrode by using silver material as an electrode, and therefore bonding between the electrode and the external terminal is in a stable state; and the unstable condition due to the conductive adhesive mentioned above does not exist.

Accordingly, in accordance with the present invention, silver material is used for the electrode, and the external terminal is soldered to the electrode; and thereby the bonded state between the electrode and the external terminal is stable irrespective of the voltage applied to the bonded part therefore, reduction in the breakdown voltage can be prevented even if a large number of capacitors are used in series-parallel connection. In addition, the reduced region formed on the surface of the dielectric ceramic element located in the vicinity of the electrode end-edge has a low insulating resistivity in comparison with other element regions, and therefore the potential gradient at the electrode end-edge part is alleviated, resulting in an improvement in the breakdown voltage of the dielectric ceramic element.

Also, in accordance with the method of the present invention, a metal material having a strong oxidizing inclination is coated on the dielectric ceramic element, and thereby the reduced region is formed on the surface of the dielectric ceramic element. In addition, the electrode and the external terminal are soldered, and therefore the highvoltage ceramic capacitor as described above is obtainable.

The above-described object and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
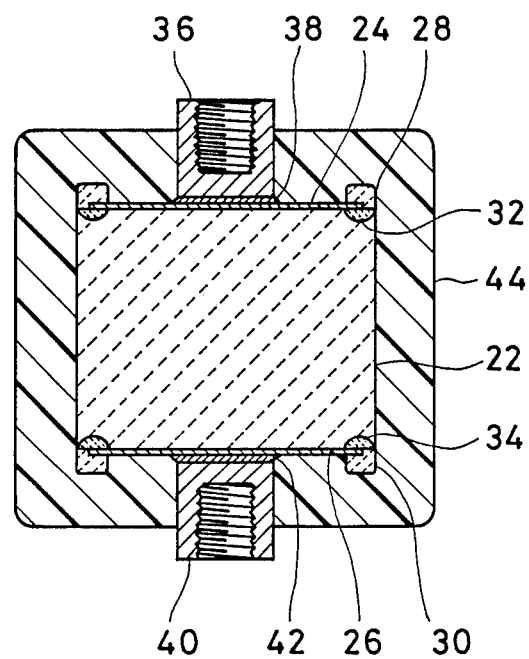
FIG. 1 is a cross-sectional view showing a structure of a high-voltage ceramic capacitor which is an embodiment in accordance with the present invention.
Figure 2A:
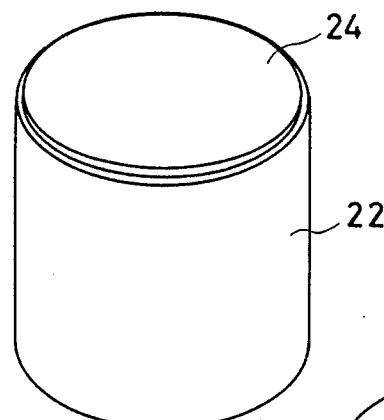
FIG. 2A, FIG. 2B, and FIG. 2C are perspective views showing the state each process in manufacturing same capacitor of FIG. 1.
Figure 2B:
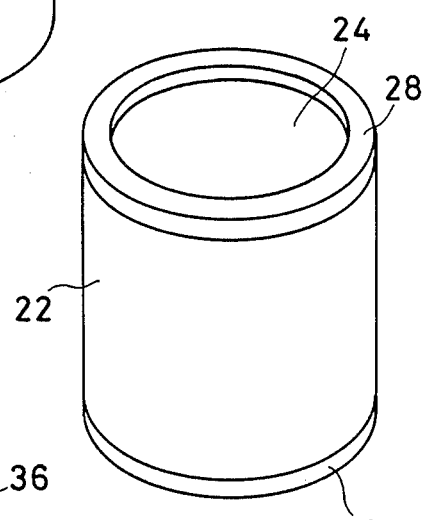
Figure 2C:
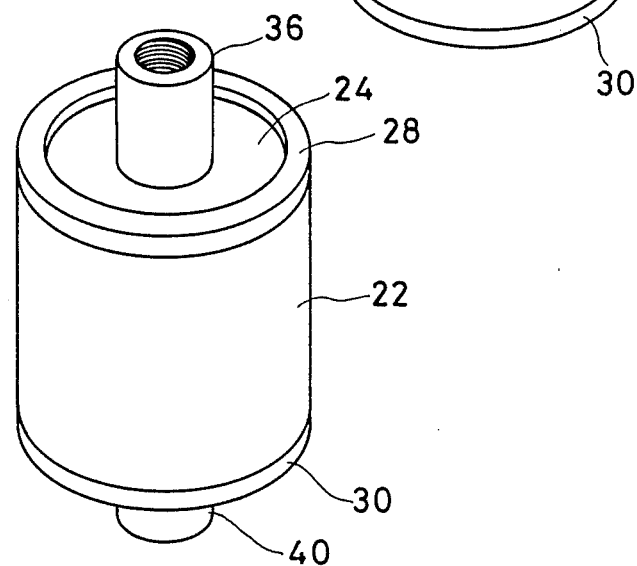

FIG. 1 is a cross-sectional view of a high-voltage ceramic capacitor which,. is an embodiment in accordance with the present invention; and FIG. 2A, FIG. 2B and FIG. 2C are perspective views showing the state of each process in manufacturing such capacitor.

A high-voltage ceramic capacitor 20, as shown in FIG. 1, comprises a cylindrical dielectric ceramic element 22 composed of material such as $BaTiO_3$ series or $SrTiO_3$ series, and silver electrodes 24 and 26 are formed on the top and bottom surfaces of the dielectric ceramic element 22. These electrodes 24 and 26 are formed so that the diameters thereof are smaller than the diameter of the dielectric ceramic element 22. Then, reducing agent layers 28 and 30 are formed in an annular shape on the end-edge part of the electrodes 24 and 26. Reduced regions 32 and 34 of the dielectric ceramic are formed in an annular shape respectively in the surface part of the, dielectric ceramic element 22 in the vicinity of these reducing agent layers 28 and 30. An external terminal 36 is soldered to the center part of the electrode 24 through a solder layer 38. Similarly, an external terminal 40 is soldered to the center part of the electrode 26 through a solder layer 42. Furthermore, the outer surface exclusive of of the external terminals 36 and 40 is molded with an insulating resin 44.

The high-voltage ceramic capacitor as shown in FIG. 1 is manufactured specifically as follows.

First, as shown in FIG. 2A, a conductive paste containing as a main component silver powder, frit glass and the like is coated by the screen printing method on the end surfaces of the ceramic element 22 within a range whose diameter is smaller than the diameter of the element 22 by a predetermined amount. The structure is heated at a temperature of about 150° C., thereafter passing through a furnace at a maximum temperature of 860° C. taking a passage time of 10–15 hours to form silver electrodes.

Subsequently, for a reducing agent, a paste the main components of which are, for example, an about 80wt% of aluminum powder and about 20wt% of borosilica lead glass is prepared. This paste is coated in an annular shape within a range the outer diameter of which is larger than the diameter of the electrode and the inner diameter of which is smaller than the diameter of the electrode, and is heated and dried at a temperature of about 150° C. Thereafter, the element 22 coated with the paste is fired by passing through a furnace at a maximum temperature of 830–860° C. with a passage time of about two hours. During this firing, aluminum powder contained in the paste locally reduces the surface parts of the dielectric ceramic element to form the annular-shaped reduced regions 32 and 34. In addition, aluminum powder is shielded from the air by borosilica lead glass, and therefore any oxidizing reaction of aluminum powder by oxygen in the air hardly progresses. The insulating volume resistivities of the reduced regions 32 and 34 formed by this firing process become $10^9 \Omega$ cm or less, being greatly reduced in comparison with $10^{12}$–$10^{14} \Omega$ cm before the reduction.

Thereafter, as shown in FIG. 2C, the external terminals 36 and 40 are soldered to the center parts of the electrodes 24 and 26 respectively, and further the resin mould 44 is applied; and thus the high-voltage ceramic capacitor is manufactured.

In addition, the reducing agent may be coated on the exposed portions of the dielectric ceramic element 22 after coating of conductive paste and before heating it. In this case, the reducing regions 32 and 34 are formed in the element 22 simultaneously with forming the silver electrodes by heating the dielectric ceramic element 22 coated with both the conductive material and the reducing agent.

Figure 4:
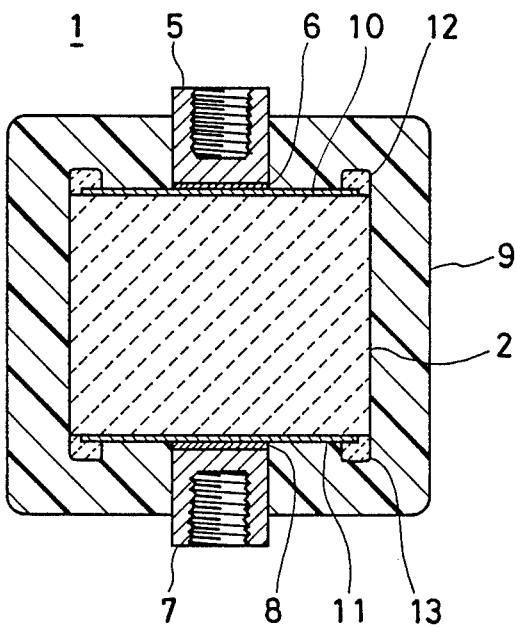

The following table shows the results of a breakdown test conducted on the capacitor of the embodiment in accordance with the present invention as described above and the conventional capacitor as shown in FIG. 4.

TABLE

|  | Test on discrete capacitor | Test on lumped capacitor |
| --- | --- | --- |
| Embodiment | 1.4–1.6 | 1.3–1.5 |
| Conventional example (FIG. 3) | 1 | 0.6–0.8 |
| Conventional example (FIG. 4) | 1.4–1.7 | 1.1–1.3 |

Figure 3:
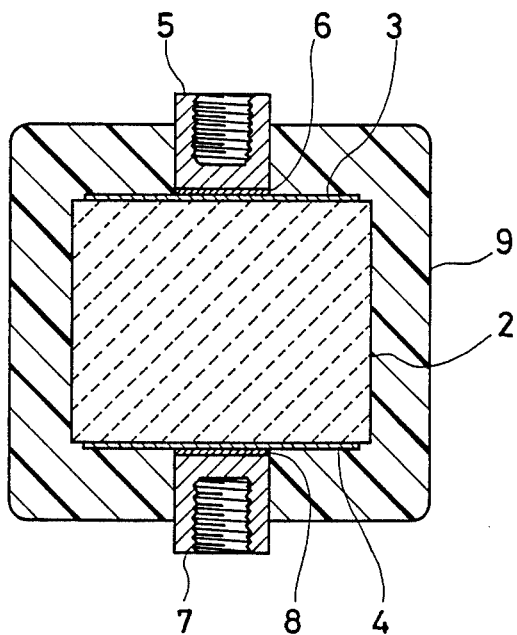
FIG. 3 and FIG. 4 are cross-sectional views showing structures of conventional high-voltage ceramic capacitors.

Here, each numeric value shows the voltage ratio taking the value of breakdown voltage as 1, which was obtained by conducting the breakdown test discretely on the capacitors as shown in FIG. 3 wherein the silver electrodes are used and the external terminals are connected thereto by the conductive adhesive Also, each numeric value obtained by the test on the lumped capacitors shows the voltage ratio of the calculated breakdown voltage per one capacitor when the breakdown test was conducted with a plurality of capacitors connected in a series-parallel fashion.

Thus, the capacitor of the embodiment in accordance with the present invention, when used alone, can realize a withstand voltage nearly equal to that of the capacitor of the type as shown in FIG. 4 wherein glass treatment is applied to the aluminum electrodes. In addition, even when a large number of capacitors are used, the voltage per one capacitor becomes a value nearly equal to the value obtained by the test on discrete capacitors.

Although the present invention has been described and illustrated in detail, it is clearly understood that the same is by way of illustration and example only, and is not to be taken by way of limitation, the spirit and scope of the present invention being limited only by the terms of the appended claims.

What is claimed is:

1. A high-voltage ceramic capacitor comprising:
a dielectric ceramic element having an outer surface;
a pair of electrodes formed on said outer surface of the dielectric ceramic;
a respective reduced-resistivity region formed only in the vicinity of the end-edge of each of said electrodes and extending outwardly from respective depths into the ceramic element only as far as said outer surface of said dielectric ceramic element;
said electrodes being formed with silver material; and
respective external terminals soldered to said electrodes.

2. A high-voltage ceramic capacitor in accordance with claim 1, wherein the main component of said dielectric ceramic element is strontium titanate system material or barium titanate system material.

3. A method of manufacturing a high-voltage ceramic capacitor comprising the steps of:
(a) preparing a dielectric ceramic element having an outer surface;
(b) preparing a conductive material the main component of which is silver powder;
(c) preparing a reducing agent the main component of which is a metal having an oxidizing inclination stronger than that of said dielectric ceramic element;
(d) coating said conductive material on said outer surface of said dielectric ceramic element so that said surface of said dielectric ceramic element is exposed at the end-edge parts thereof;
(e) forming the electrodes by heating said conductive material coated on said dielectric ceramic element;
(f) coating said reducing agent on the exposed portions of said dielectric ceramic element at said electrode end-edge parts;
(g) forming reduced-resistivity regions in said dielectric ceramic element by heating said dielectric ceramic element coated with said reducing agent, said reduced-resistivity regions being located only in the vicinity of the end-edge of said electrode and extending outwardly from respective depths into the ceramic element only as far as said outer surface; and
(h) soldering an external terminal to each of said electrodes.

4. A method of manufacturing a high-voltage capacitor in accordance with claim 3, wherein the step of soldering said external terminal to each of said electrodes is executed after the step of forming said reducing regions in said dielectric ceramic element.

5. A method of manufacturing a high-voltage ceramic capacitor in accordance with claim 3, wherein the material of said reducing agent is a paste containing as the main component, aluminum powder, nickel powder or copper powder, and glass powder.

6. A method of manufacturing a high-voltage ceramic capacitor comprising the steps of:
(a) preparing a dielectric ceramic element having an outer surface;
(b) preparing a conductive material the main component of which is silver powder;
(c) preparing a reducing agent the main component of which is a metal having an oxidizing inclination stronger than that of said dielectric ceramic element;
(d) coating said conductive material on said outer surface of said dielectric ceramic element so that said surface of said dielectric ceramic element is exposed at the end-edge parts thereof;

(e) coating said reducing agent on the exposed portions of said dielectric ceramic element at the end-edge parts of said conductive material coated on said dielectric ceramic element;

(f) forming reduced-resistivity regions in said dielectric ceramic element simultaneously with forming electrodes by heating said dielectric ceramic element coated with said reducing agent, said reduced-resistivity regions being located only in the vicinity of the end-edge parts of said conductive material and extending outwardly from respective depths into the ceramic element only as far said outer surface; and (g) soldering an external terminal to each of said electrodes.

* * * * *